United States Patent Office 2,787,643
Patented Apr. 2, 1957

2,787,643

ISOMERIC TRICHLOROETHOXYHEXENES

Earl W. Lane, Philadelphia, and Warren D. Niederhauser, Huntingdon Valley, Pa., assignors to Rohm & Haas Company, Philadelphia, Pa., a corporation of Delaware No Drawing. Application March 2, 1954,
Serial No. 413,731

3 Claims. (Cl. 260—614)

This invention relates to isomeric trichloroethoxyhexenes and more particularly to 1,1,6-trichloro-2-ethoxy-4-hexene and 1,1,4-trichloro-2-ethoxy-5-hexene. This invention also relates to a method for the preparation of the isomeric trichloroethoxyhexenes by reacting butadiene with $\alpha,\beta,\beta$-trichloroethyl ether in the presence of a Friedel-Crafts catalyst.

In the present invention butadiene is reacted with $\alpha,\beta,\beta$-trichloroethyl ether to form the desired isomeric products, usually resulting in yields of about 55% of that theoretically possible. While any conventional mixing method may be employed it is preferable that the butadiene be introduced into the $\alpha,\beta,\beta$-trichloroethyl ether at a relatively slow rate over a period of several hours in order to achieve the maximum yields. Of course, the time necessary for the introduction of butadiene will depend on the speed of introduction and the amount of butadiene used. It is preferable that the butadiene be reacted in equimolar amounts with the $\alpha,\beta,\beta$-trichloroethyl ether in order to avoid the possible formation of by-products. The butadiene is preferably introduced over a period of one to six hours. A more rapid introduction of butadiene may be employed, if desired, but generally the slower rate is preferred in order to obtain the maximum amount of desired reaction products and to avoid waste of the butadiene. The reaction is usually essentially completed within three to four hours after the completion of butadiene addition.

Although a solvent is not normally needed in the subject reaction such may be employed, if desired, to aid in the retention of butadiene in intimate proximity with the $\alpha,\beta,\beta$-trichloroethyl ether. Suitable solvents include carbon tetrachloride, formic acid, acetic acid, ethylene dichloride, and the like.

A catalyst should be employed to consummate the desired reaction. Suitable catalysts are those of the Friedel-Crafts type such as zinc chloride, zinc stearate, aluminum chloride, titanium tetrachloride, antimony trichloride, ferric chloride, stannic chloride, boron trifluoride, and the like. Although some small amounts of water may be tolerated, the catalyst, as well as the general reaction conditions, should be essentially anhydrous. The amount of catalyst employed may range from about 0.5 to 10% of the weight of ether used, as desired, with an average amount of 5% being quite satisfactory.

It is preferable, generally, to employ a relatively low reaction temperature. Temperatures in the range of —10 to 100° C. have been found to be satisfactory, although other suitable temperatures may be employed. The temperature may be varied in coordination with the amount and kind of catalyst employed. Usually, a lower temperature may be used when a higher percentage of a more active catalyst is employed. For instance, in this reaction one of the most active catalysts appears to be zinc chloride. With zinc chloride, in the approximate amount of 5%, a reaction temperature of about 10 to 30° C. may be satisfactorily employed. Otherwise, the choice of operating temperatures, as well as the catalyst, is largely a matter of convenience and expedience.

After the completion of the reaction the catalyst is removed by washing the reaction mixture with water, then with an aqueous solution of about 10% sodium carbonate, and finally with more water. The water layer is discarded and the product layer is dried, preferably over a desiccant such as anhydrous magnesium sulfate. The product layer is finally filtered and fractionally distilled to obtain the desired products.

The reaction of the present invention produces an isomeric mixture of 1,1,6-trichloro-2-ethoxy-4-hexene and 1,1,4-trichloro-2-ethoxy-5-hexene. These compounds are useful in the fields of fungicides, bactericides, and insecticides. They react with alcohols, phenols, mercaptans, and amines to form compounds which are also useful as fungicides, bactericides, and insecticides. The hexenes of the present invention are useful as intermediates for the corresponding carboxylic acid esters which are good plasticizers. These ester derivatives are formed by reacting the trichlorohexenes with a carboxylic acid salt. The presence of two chlorine atoms on one carbon atom in the products of the invention makes it possible to form the corresponding aldehydes by hydrolysis. These aldehydes are useful as fungicides, bactericides, and insecticides.

The present invention may be more fully understood from the following illustrative example in which parts are expressed by weight.

*Example*

There were added into a standard three-necked glass flask equipped with a thermometer, stirrer, inlet tube, and reflux condenser 30 parts of anhydrous zinc chloride and 465 parts of $\alpha,\beta,\beta$-trichlorethyl ether. Butadiene was introduced slowly into the ether. The addition of butadiene was continued over a period of six hours, during which time 125 parts were introduced into the reaction system. The temperature of the system was maintained at 10 to 20° C. during the butadiene addition. After the entire 125 parts of butadiene had been added, the reactants were stirred for three hours during which time the temperature rose to 25 to 30° C. (room temperature). The mixture was washed with water and then with an aqueous 10% sodium carbonate solution and with water. A separation of layers occurred and the water-insoluble layer was dried over anhydrous magnesium sulfate and filtered. The product was distilled at a pressure of 1.7 to 2.0 mm. and a temperature of 95° to 118° C., yielding 225 parts. The remainder was distilled at a pressure of 2.0 to 2.2 mm. and a temperature of 118° to 170° C., yielding 108 parts. The total of the distilled products represented a yield of about 56% based on the amount of ether used. The chlorine content of the products was 44.2 to 44.8% (46.1% theoretical) and the molecular weight was 244 (232 theoretical). The analytical determinations correspond to the theoretical values for the isomeric trichloroethoxyhexenes. Apparently the lower boiling fractions is 1,1,4-trichloro-2-ethoxy-5-hexene and the upper boiling fraction is 1,1,6-trichloro-2-ethoxy-4-hexene.

We claim:

1. An isomeric mixture of 1,1,6-trichloro-2-ethoxy-4-hexene and 1,1,4-trichloro-2-ethoxy-5-hexene.

2. As a new composition of matter 1,1,6-trichloro-2-ethoxy-4-hexene.

3. As a new composition of matter 1,1,4-trichloro-2-ethoxy-5-hexene.

References Cited in the file of this patent

UNITED STATES PATENTS 2,624,753    Emerson et al. _____ Jan. 6, 1953